United States Patent [19]

Merkle et al.

[11] 4,128,778

[45] Dec. 5, 1978

[54] EXTERNAL-ROTOR MOTOR SUPPORTED BY MOUNTING FLANGE

[75] Inventors: Alfred Merkle; Georg F. Papst, both of St. Georgen, Fed. Rep. of Germany

[73] Assignee: Papst-Motoren KG, St. Georgen im Schwarzwald, Fed. Rep. of Germany

[21] Appl. No.: 720,082

[22] Filed: Sep. 2, 1976

[30] Foreign Application Priority Data

Sep. 8, 1975 [CH] Switzerland .................. 011559/75

[51] Int. Cl.² ............................................. H02K 9/06
[52] U.S. Cl. ................................... 310/67 R; 310/62; 310/63; 310/90
[58] Field of Search ................ 310/67, 62, 63, 51, 310/90

[56] References Cited

U.S. PATENT DOCUMENTS

| | | | |
|---|---|---|---|
| 2,990,112 | 6/1961 | Levy et al. | 310/67 X |
| 3,002,118 | 9/1961 | Papst | 310/67 X |
| 3,032,666 | 5/1962 | Papst | 310/62 X |
| 3,483,407 | 12/1969 | Frohmuller et al. | 310/51 |
| 3,786,290 | 1/1974 | Papst et al. | 310/67 X |
| 3,814,960 | 6/1974 | Burgbacher | 310/62 X |

Primary Examiner—Donovan F. Duggan
Attorney, Agent, or Firm—Michael J. Striker

[57] ABSTRACT

The motor includes an internal stator and an external rotor. A rotor shaft is connected to and rotates with the rotor. A mounting flange is located at one of the two axial ends of the motor. A bridge is fixedly connected with the mounting flange, and is in the form of a cylindrical housing connected at one axial end to the mounting flange, the end of the cylindrical housing remote from the end connected to the mounting flange extending radially inward with axial spacing from the rotor and having at such remote end at least one opening for the flow of external air therethrough. The external rotor is generally bell-shaped. Blower blades are provided on the external rotor in the region of the bottom of the bell-shaped external rotor. The motor at the axial end thereof provided with the mounting flange is provided with at least one opening for the axial flow of air through the interior of the cylindrical housing.

18 Claims, 6 Drawing Figures

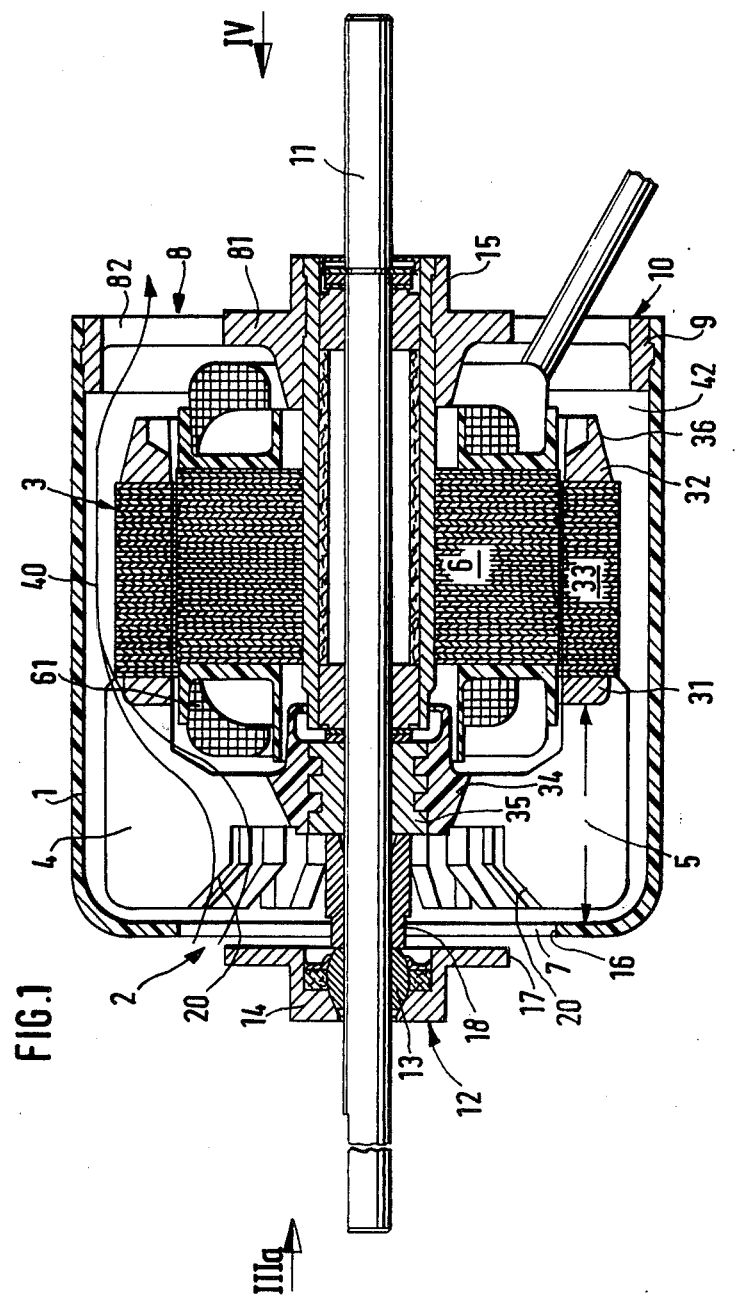

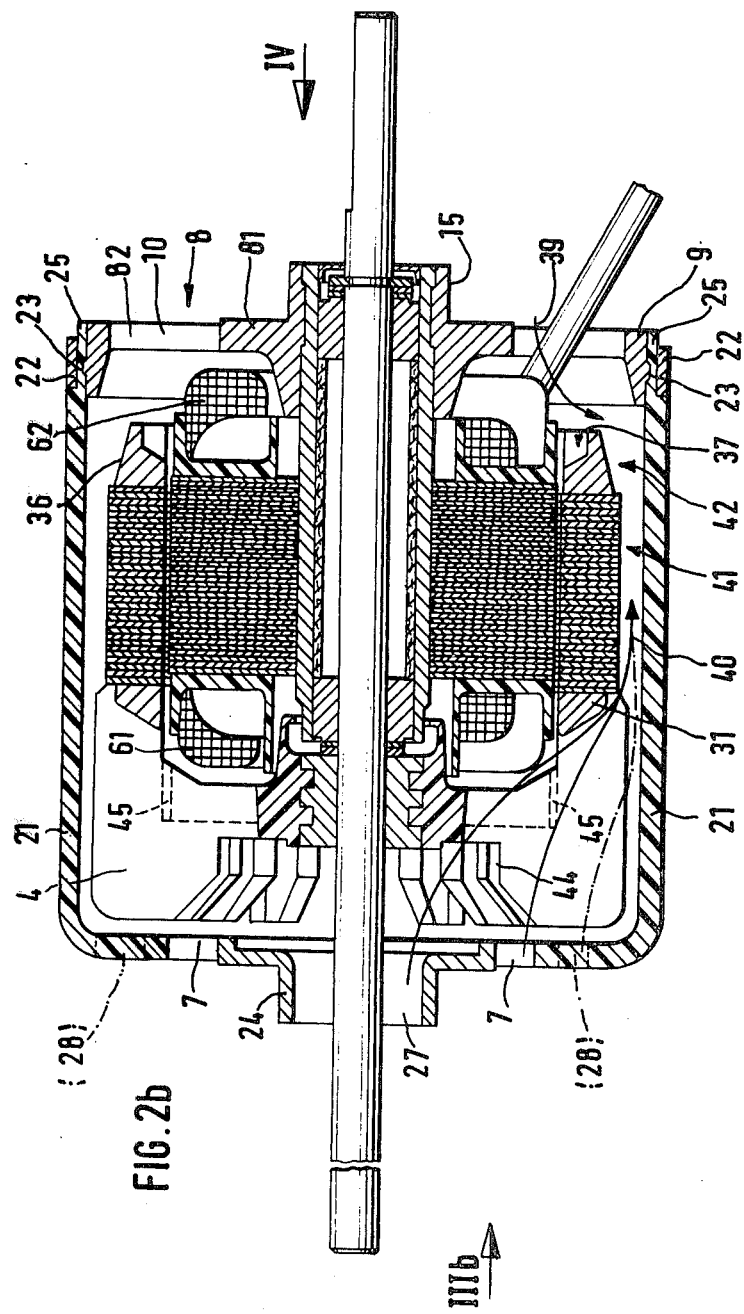

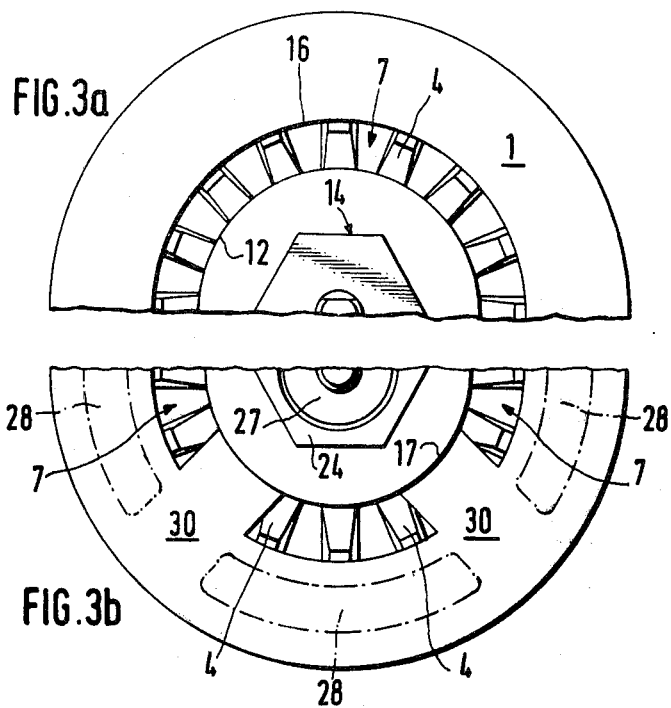
FIG.3a
FIG.3b
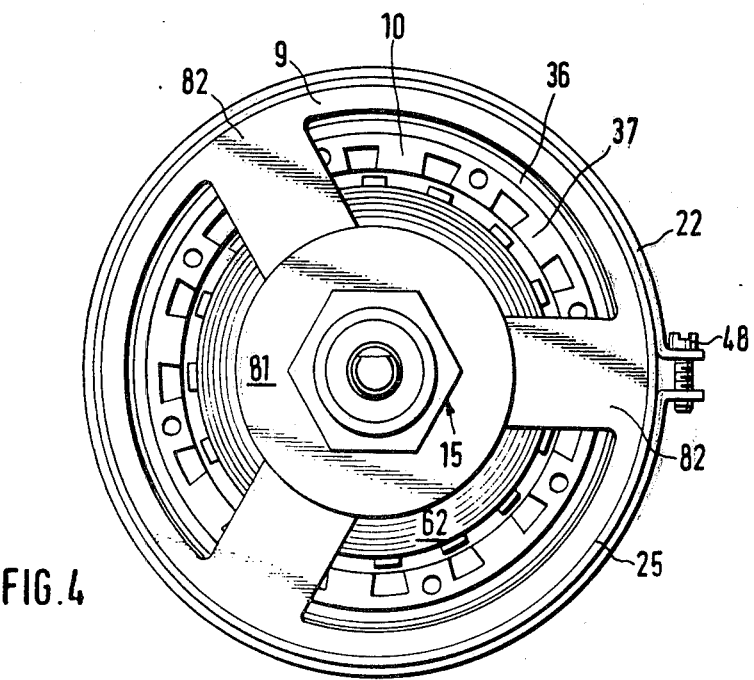
FIG.4

EXTERNAL-ROTOR MOTOR SUPPORTED BY MOUNTING FLANGE

BACKGROUND OF THE INVENTION

The invention relates to an external-rotor motor with flange mounting, with the flange being fixedly connected to a bridge which embraces the motor. At the axial end of the motor opposite to that provided with the mounting flange, the bridge directly or else the rotor shaft by means of a bearing is stationarily supported, preferably through the intermediary of vibration-damping elements. The rotor shaft at at least one of the two axial ends of the motor projects out from the remainder of the motor to make possible coupling of the rotor shaft to the device to be driven.

Such motors are known for the powering of office machines. With recent high-power devices of this type, besides the requirements of low operating noise and low operating temperature, it is sometimes also desired that the drive motor additionally effect a positive cooling or ventilation of the driven device. Furthermore, there are often to be taken into account very stringent requirements or even official regulations relating to protective insulation, the dimensions of the space available for accommodating the drive motor, and the like.

SUMMARY OF THE INVENTION

It is a general object of the invention to achieve in the simplest and most economical manner these to some extent opposing goals.

According to one advantageous concept of the invention, this can be done by designing the bridge as a cylindrical housing closed around the rotational periphery, with the cylindrical housing at one of the axial ends of the motor being axially spaced from the rotor proper, with openings being left for the axial flow of air through the motor and being radially inwardly extending, with the external rotor in the region of the base of the rotor bell being provided with ventilating blades, and with openings furthermore being provided at the axial end of the motor provided with the flange for the passage therethrough of air.

According to another concept of the invention, the cylindrical housing is made of synthetic plastic material, with the one or two outwardly projecting ends of the rotor shaft as well as the vibration-damping elements and the portions of the flange member which can be contacted from outside the motor all being of insulation-protected design.

The insulation-protected design of the rotor shaft can be achieved if there is supported on one rotor shaft end a driven element made of synthetic plastic, for example a gear pinion or a synthetic plastic blower wheel or fan wheel, so that the shaft will be covered on all sides; or else, if use is made of an external-rotor synthetic plastic housing, for example such as disclosed in Federal Republic of Germany Pat. No. 1,966,205, the mounting pipe can have a cylindrical protective insulation layer extending to the stator iron. The vibration-damping elements can themselves be designed to afford protective insulation or can be embedded in a suitably insulating synthetic plastic capsule structure which meets the requirements in question.

The mounting flange is in general, although not absolutely necessarily, located at the air outflow end of the motor, and it is generally made of metal. If it is provided with relatively large openings, these can be covered over with a screen made of synthetic plastic material. This applies likewise to the air inflow end of the motor. The protective-insulation covering over of the flange portions can also be realized after installation of the motor by means of adjoining parts or components of the device being driven by the motor.

If the rotor shaft at the axial end of the motor not provided with the mounting flange is stationarily supported by a bearing—e.g., a self-adjusting hemispherical bearing—the air inflow opening will be disposed radially outward of such arrangement in the axial end face region of the synthetic plastic housing; on the other hand, if the housing bridge is directly supported, an air inflow opening can be provided directly around the shaft in the axial end face portion of the housing. Downstream of the air inflow opening, there can be arranged airflow guide walls, preferably of conical configuration, and disposed rotation-symmetric relative to the motor axis. These can serve to direct the airflow very positively to specific portions of the interior of the motor particularly in need of cooling action, for example.

The blower blades on the external rotor are cast of one piece with the short-circuited rotor cage housing, and there is cast into the base of the rotor bell a sleeve member, in order that the coaxial rotor shaft can be secured therein, preferably by means of force fitting.

This per se known external rotor housing has radially oriented blower blades. However, curved blades would be even better in terms of airflow.

What is involved is not merely an effective circulation around the motor; instead, it will sometimes be more important to achieve a penetration of air through the interior of the motor or through or around the internal stator of the motor.

Besides the aforementioned rotation-symmetric guide walls at the air inflow end of the motor housing, such guide walls can also be provided at the air outflow end of the motor. Corresponding measures are advantages for this purpose at the external rotor, as well. They will be described in greater detail in the detailed description, below.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 depicts a first embodiment in a longitudinal axial section, with the axial end of the rotor shaft remote from the end of the motor having the mounting flange being stationarily supported by means of a hemispherical bearing;

FIGS. 3a and 3b are axial end views facing toward the air inflow end of the motors of FIGS. 1 and 2, respectively, as viewed in the directions of arrows IIIa and IIIb, respectively; and FIG. 4 depicts the motor of FIG. 2 as seen looking at the axial end of the motor provided with the mounting flange, which is nearly identical to the end view of FIG. 1, as seen looking in the direction of arrow IV.

DESCRIPTION OF THE PREFERRED EMBODIMENTS

Figure 2A:
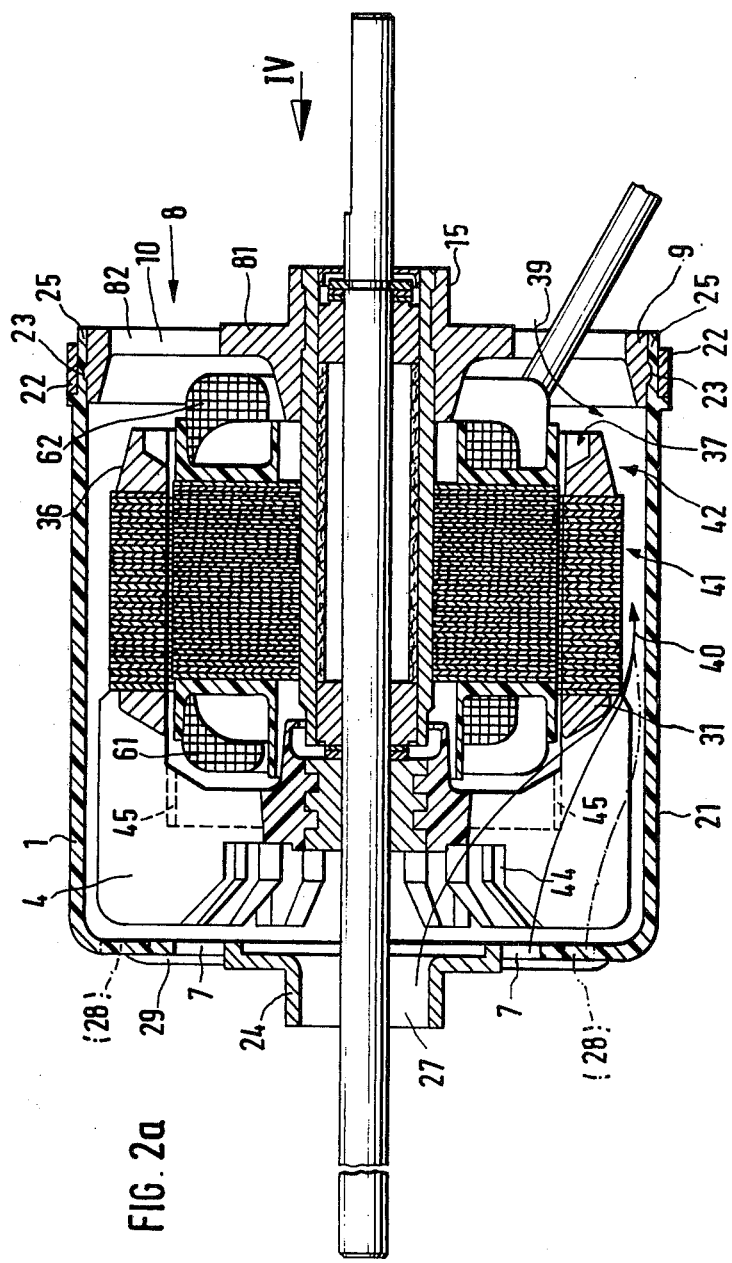
FIG. 2 depicts a second embodiment, with the synthetic plastic housing of the motor at the axial end of a motor not provided with the mounting flange extending radially inward to a hub insert, with the latter projecting axially, so that the housing, supported in bridge-like manner, can be stationarily supported at this collar insert in the device to be driven.

The motor of FIG. 1 includes a synthetic plastic cylindrical housing 1. At the inflow side 2 of housing 1, there are provided on the external rotor 3 of the motor intermediate housing 1 and external rotor 3, in the vicinity of the axial gap 5, ventilating blades 4 located downstream of the inflow openings 7. At its other axial end, the motor is provided with a flange 8 inserted into the synthetic plastic housing 1. Flange 8 is provided with outflow openings 10. Flange 8 supports the internal stator 6 of the motor and the rotor shaft 11 journalled in internal stator 6. The synthetic plastic housing 1, in the inflow region, is radially inwardly extended only to a slight extent.

Rotor shaft 11, at the axial end 2 of the motor opposite to that provided with flange 8, is rotatably supported in the device to be powered by means of a discrete element 12 provided with a hemispherical bearing 13. The forwardly and inwardly projecting collar 14, which surrounds the self-adjusting bearing 13, has a prismatic contour when viewed in axial end view (see FIGS. 3a and 3b), to establish an interlocking or form-locking mounting of the motor in damping elements provided at the side of the motor at which it is installed. The same applies to the collar 15 at the axial end of the motor provided with flange 8 (see FIG. 4). The axial spacing between element 12 and rotor 3 is established and maintained by sleeve 18. As a result, the axial position and spacing of the outer rim 17 of element 12 relative to the inner rim 16 of housing 1 is adjustable or controllable. The radial distance between the rims 16, 17 sets the minimum air inflow cross-section.

At the air inflow side of the motor, the cooling blades 4 are provided with cut-outs which have a coaxial conical or truncated conical internal envelope surface 20 for the sake of better air inflow. The blades 4 are cast of one piece together with the short-circuit rings 31/32 and the hub 34 of the bell-shaped rotor structure 3 (4, 31-35). The bottom (left-side) of this bell is open. At the bottom of this bell-shaped rotor housing 3, sixteen flat blades 4, arranged in a star pattern extend from the hub 34 (which for reasons of proper flow is of conical configuration) with its cast-in steel bushing 35 out to the surrounding short-circuit ring 31, so that the air passing through the motor (arrow 40) will flow outward from the inner part of the envelope surface 20 to cool the coil end 61 of the stator. At the air outflow end of the motor, the outer surface 36 of the short-circuit ring 32 is of tapered conical configuration to effect a rightward increase of the airflow cross-section and thereby establish a diffusor-like action.

FIG. 2 depicts another exemplary motor construction. The motor housing here has a collar-like projection 24 located at the end face of the motor housing at the air inflow side of the motor. The external rotor of the motor has cooling blades 4 cast of one piece therewith. The air drawn in through the inflow openings 7, 27 is guided by the blades 4 radially outward to the wall of the synthetic plastic housing 21 (see arrow 40). The blades 4 extend out from the rotor lamella packet exclusively in axial direction, so that the small annular airflow clearance 41 will in its entirety be utilized and not be blocked by the blades 4. If the blades 4 extended from the external rotor radially outward, instead of axially leftward as shown, then undesirable flow behaviour would result, because the potentially available flow cross-section would be actually available only to a limited extent.

The metal flange 8 at its outer periphery 9 is inserted into the synthetic plastic casing 1, 21. A holding band 22 holds the outer peripheral portion 9 of the flange 8 in fixed interlocking engagement with projections 23 on the rim portion 25 of the synthetic plastic housing. The holding band 22, which is for example aligned with the housing 21, is tightened about the outer annular portion 9 of the flange 8 by press fitting or by resort to tightening means (FIG. 4). The bell-shaped housing 1 at its open end has, for example, three axially extending, circumferentially spaced peripheral notches; accordingly, if the rim portion 25 is expanded the flange 8 can be pushed into the housing 1, 21 until the projections 23 and notches 26 interengage and establish a form-locking connection. Moreover, this can be effected prior to the placement of the holding band 22. The means for establishing the interlocking engagement are constituted by a raised peripheral portion 23 on the outer annular portion 9 of the flange 8 and a corresponding recess 26 in the rim portion 25 of the housing 1.

The upper half of FIG. 2 depicts a thinner-walled version of the housing. Here the radial web of the housing in the inflow region 2 is accordingly axially reinforced by means of ribs 29. This construction furthermore includes an additional inflow opening 28. Both the housing openings 7, 27, (28) which extend circumferentially, as well as the opening 10 at the outflow end of the motor, because of existing safety regulations, need not have more than a certain radial thickness, e.g., 6.3 mm (VDE, SEV-Code).

In FIG. 2 triangular cut-outs 44 are provided in the inner part of the inflow region of the cooling blades 4. These serve to strengthen the inflow of air in radial inward direction into the blades 4 and to pull the flowing air as strongly as possible along the coil end 61. This purpose is also served by the relatively small but still electromotor-handleable axial height of the short-circuiting ring 31 and the rounding off of its outer edge (or its sloping off to assume a half-trapezoidal cross-section as shown in the lower half of FIG. 2. Advantageously, the short-circuiting ring is there radially inward at the air gap (in the region of the rotor grooves) axially highest). The cut-out 44 also increases the inflow cross-section for the flow of air into the blades 4, which effects a noise reduction. A better flow of air to the coil end 61 is achieved with a cylindrical (or conical) ring 45 (shown in broken lines in FIG. 2), this ring extending around the entire periphery between the (e.g., sixteen) blades (see FIG. 4) which for the sake of simplicity is injection-molded integral with the rotor cage (31, 32, etc.), with its outer diameter approximately corresponding to the diameter of the air gap. At the outflow end of the motor, inward radial blades 37 establish a radial airflow component 39 at the short-circuiting ring 32 in the region 42, which improves the ventilation and cooling of the coil end 62.

In the case of a reduced additional cooling requirement, the additional inflow opening 28 (accordingly shown in broken lines in the lower half of FIG. 2) can be dispensed with.

FIG. 3a depicts the axial end of the motor as seen looking along the arrow IIIa of FIG. 1. What is depicted is the air inflow end 2 in the upper half of FIG. 1. Likewise, FIG. 3b depicts the axial end opposite to the one provided with the flange (the air inflow side 2) as viewed along the arrow IIIb of FIG. 2 and in particular that of the lower half. The additional inflow opening 28 is shown in broken lines. Its cross-section surface makes it distinctly clear that it drastically increases the inflow cross-section, because it is located radially further outward. This can be important in many practical applications.

In the construction of FIG. 2, radial webs 30 are necessary, shown in FIG. 3b as being relatively wide as considered in the circumferential direction. Assembly and sturdiness requirements make this width necessary. For a good inflow of air into the motor housing, these radial webs should be as narrow as possible. The same holds true for the webs 82 of the flange 8 at the outflow end of the motor.

FIG. 4 is an axial end view looking at the outflow end of the motor, i.e., the end of the motor provided with flange 8 corresponding to arrow IV in FIG. 2. The threaded connector 48 serves to hold the holding band 22 tight against the open rim 25 of the cylindrical housing 1 or 21 and to press the latter, i.e., the rim 25, against the peripheral rim portion 9 of the flange 8. The openings 10 are of relatively large area.

The components in the several Figures denoted by the same reference numerals serve the same function, even when such components are not separately described in detail in connection with all embodiments.

It will be understood that each of the elements described above, or two or more together, may also find a useful application in other types of constructions differing from the types described above.

While the invention has been illustrated and described as embodied in an external rotor motor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An external rotor motor of protectively insulated and internally cooled design, comprising, in combination, an internal stator; a generally bell-shaped external rotor surrounding the stator, the generally bell-shaped rotor having a bottom constituting one axial end of the bell-shaped rotor; a rotor shaft connected to and rotating with the rotor; a mounting flange located at the other of the two axial ends of the rotor; a bridge fixedly connected with the mounting flange, the bridge being in the form of a protective insulating cylindrical housing connected at one axial end to the mounting flange and extending axially over the whole axial length of the rotor and being circumferentially complete to protect the rotor from physical contact by external objects, at least the exterior of the housing being made of electrically insulating material, the end of the cylindrical housing remote from the end connected to the mounting flange extending radially inward at said one axial end of the rotor with axial spacing from said one axial end of the rotor and having at such remote end a plurality of air inflow openings for the flow of external air therethrough, the air inflow openings being symmetrically arranged relative to the rotor axis, the mounting flange being provided with air outflow openings for the axial flow of air through the interior of the cylindrical housing; and blower blades provided on the external rotor in the region of the bottom of the bell-shaped external rotor axially intermediate the radially inward extending part of the housing and the remainder of the rotor, the blower blades being configured to pull air in through the air inflow openings, circulate the air in the space about the exterior of the rotor and interior of the housing and discharge the air through the air outflow openings.

2. The motor defined in claim 1, the cylindrical housing being made of synthetic plastic.

3. The motor defined in claim 1, at least one of the two axial ends of the rotor shaft being an outwardly projecting end, the motor further including vibration-damping means mounting the rotor shaft, the outwardly projecting end of the rotor shaft, the vibration-damping means and the exterior part of the mounting flange being at their exteriors comprised of electrically insulating material.

4. The motor defined in claim 1, the blower blades having radially inward cut-outs defining an envelope surface coaxial with the rotor axis, whereby to improve the inflow of air.

5. The motor defined in claim 4, the cut-outs including triangular indentations configured to make possible radial inflow of air into the blades.

6. The motor defined in claim 1, the rotor comprising short-circuiting rings and a rotor hub, the short-circuiting rings, the rotor hub, and the blower blades being parts of a single one-piece cast body.

7. The motor defined in claim 1, the blower blades when viewed in an axial end view being generally flat and extending in direction from the rotor hub point-symmetric relative thereto.

8. The motor defined in claim 1, the rotor including a rotor bushing mounted on the rotor shaft, the rotor shaft at the end of the motor remote from the end provided with the mounting flange being mounted on a hemispherical antifriction bearing, and further including a spacing element between the antifriction bearing and the rotor bushing.

9. The motor defined in claim 4, the motor being directly supported at its housing at the side thereof opposite to the mounting flange, the housing at the side thereof opposite to the mounting flange being provided with additional air inflow-openings.

10. The motor defined in claim 4, the rotor including a short-circuiting ring at the end thereof opposite to the mounting flange, the external peripheral edge of the short-circuiting ring being rounded-off.

11. The motor defined in claim 4, further including a thin-walled annular air guide on the rotor having approximately the diameter of the air gap between the rotor and stator and extending axially in the direction from the rotor toward the end of the motor opposite to that provided with the mounting flange.

12. The motor defined in claim 11, the annular air guide being slightly conical.

13. The motor defined in claim 11, the annular air guide being of one piece with the external rotor cage.

14. An external rotor motor of protectively insulated and internally cooled design, comprising, in combination, an internal stator; a generally bell-shaped external rotor surrounding the stator; a rotor shaft connected to and rotating with the rotor; a mounting flange located at one of the two axial ends of the motor; a bridge fixedly connected with the mounting flange, the bridge being in the form of a cylindrical housing connected at one axial end to the mounting flange, at least the exterior of the housing being made of electrically insulating material, the end of the cylindrical housing remote from the end connected to the mounting flange extending radially inward with axial spacing from the rotor and having at such remote end a plurality of openings for the flow of external air therethrough, the openings being symmetrically arranged relative to the rotor axis; blower blades provided on the external rotor in the region of the bottom of the bell-shaped external rotor between the radially inward extending part of the housing and the remainder of the rotor, the mounting flange being provided with openings for the axial flow of air through the interior of the cylindrical housing, the mounting flange being received within the housing in interlocking engagement therewith.

15. The motor defined in claim 14, further including a holding band surrounding the housing and tightly holding the mounting flange engaged within the housing.

16. An external rotor motor of protectively insulated and internally cooled design, comprising, in combination, an internal stator; a generally bell-shaped external rotor surrounding the stator; a rotor shaft connected to and rotating with the rotor; a mounting flange located at one of the two axial ends of the motor; a bridge fixedly connected with the mounting flange, the bridge being in the form of a cylindrical housing connected at one axial end to the mounting flange, at least the exterior of the housing being made of electrically insulating material, the end of the cylindrical housing remote from the end connected to the mounting flange extending radially inward with axial spacing from the rotor and having at such remote end a plurality of openings for the flow of external air therethrough, the openings being symmetrically arranged relative to the rotor axis; blower blades provided on the external rotor in the region of the bottom of the bell-shaped external rotor between the radially inward extending part of the housing and the remainder of the rotor, the mounting flange being provided with openings for the axial flow of air through the interior of the cylindrical housing, the rotor including a short-circuiting ring at the end thereof adjacent the mounting flange, the exterior of the short-circuiting ring and the interior of the surrounding housing together defining an annular flow space whose flow cross-section increases in the direction towards the mounting flange.

17. The motor defined in claim 16, the openings in the mounting flange being air outflow openings, the short-circuiting ring being provided with further radially inwardly extending radial blower blades.

18. The motor defined in claim 16, further including air guide walls located upstream of the air outflow openings of the housing arranged rotation-symmetric relative to the rotor axis.

* * * * *